(12) United States Patent
Rhodenbaugh et al.

(10) Patent No.: US 7,654,417 B2
(45) Date of Patent: Feb. 2, 2010

(54) REFILLABLE PRODUCT DISPENSER AND SYSTEM

(75) Inventors: Joseph W. Rhodenbaugh, Cincinnati, OH (US); Terry Birchler, New Albany, OH (US)

(73) Assignee: Aluta, Inc., Cincinnati, OH (US)

( * ) Notice: Subject to any disclaimer, the term of this patent is extended or adjusted under 35 U.S.C. 154(b) by 897 days.

(21) Appl. No.: 10/878,700

(22) Filed: Jun. 28, 2004

(65) Prior Publication Data

US 2005/0284888 A1 Dec. 29, 2005

(51) Int. Cl.
*B67D 5/06* (2006.01)

(52) U.S. Cl. .......................... 222/153.03; 222/153.09; 222/181.3

(58) Field of Classification Search ................. 222/153.01–153.04, 153.09–153.14, 180–182
See application file for complete search history.

(56) References Cited

U.S. PATENT DOCUMENTS

| | | | |
|---|---|---|---|
| 4,073,170 A * | 2/1978 | Miyabayashi et al. | 70/256 |
| 4,360,130 A * | 11/1982 | Nishimura et al. | 222/153.09 |
| 4,582,227 A | 4/1986 | Kanfer | |
| 4,615,476 A | 10/1986 | Hobbs et al. | |
| 5,131,568 A | 7/1992 | Ringuette | |
| 5,248,066 A | 9/1993 | Olson et al. | |
| 5,253,786 A | 10/1993 | Schmidt | |
| 5,289,952 A | 3/1994 | Gueret | |
| 5,388,730 A * | 2/1995 | Abbott et al. | 222/153.13 |
| 5,413,251 A | 5/1995 | Adamson | |
| 5,480,068 A | 1/1996 | Frazier et al. | |
| 5,632,418 A | 5/1997 | Brown | |
| 5,673,825 A | 10/1997 | Chen | |
| 5,713,492 A | 2/1998 | DeGennaro | |
| 5,862,956 A | 1/1999 | Brandenburg et al. | |
| 5,992,698 A | 11/1999 | Copeland et al. | |
| 6,082,586 A | 7/2000 | Banks | |
| 6,131,773 A | 10/2000 | Wade et al. | |
| 6,279,623 B1 * | 8/2001 | Smith | 141/20 |
| 6,325,245 B1 * | 12/2001 | Matthews | 222/52 |
| 6,427,875 B1 | 8/2002 | Hoang et al. | |
| 6,540,117 B2 | 4/2003 | Powling | |
| 6,648,179 B2 | 11/2003 | Lewis et al. | |
| 2003/0127470 A1 | 7/2003 | DeKoning et al. | |
| 2005/0133626 A1 * | 6/2005 | Hornsby et al. | 239/380 |

* cited by examiner

*Primary Examiner*—J. Casimer Jacyna
(74) *Attorney, Agent, or Firm*—Dinsmore & Shohl LLP (57) ABSTRACT

A refillable product dispenser includes a housing having a frame and a front cover with open and closed positions relative to the frame, a receptacle associated with the housing, and a pushbutton configured to be at least partially received by the receptacle in one of alternative unlocked and locked orientations. The dispenser further includes a dispensing system with a product container having a spout disposed at a first dispensing angle, a nozzle disposed at a second dispensing angle and a dispensing lever configured to activate the spout when force is applied to the lever.

22 Claims, 9 Drawing Sheets

REFILLABLE PRODUCT DISPENSER AND SYSTEM

FIELD OF THE INVENTION

This invention relates to a refillable product dispenser for public and private use. More particularly, this invention relates to a dispenser for conveniently supplying a liquid product such as a cleansing liquid to a user that is configured to be used in either of locked or unlocked conditions for placement in a public and/or private location.

BACKGROUND OF THE INVENTION

Liquid dispensers of various sorts are generally known. Such dispensers are usually placed in public and private restrooms for dispensing cleansing soap or the like to a person's hand. Some applications include a dispensing nozzle that ejects product at some point along the dispenser so that a person must use two hands to receive the soap (e.g. one hand to pump the dispenser and another hand to receive the soap). Other applications include levers located at the bottom of the dispenser configured to supply soap when a person pulls the lever toward themselves so that only one hand need be used. An issue arises with such dispensers in that the stream of liquid exiting the dispenser is often uncontrolled or at an inconvenient angle or placement, lending to user frustration, waste and mess. More specifically, previous dispensers merely provide a sometimes hidden or unpredictable exit for the liquid. As a result, soap will fall to the floor if a person's hand is not in an exact position for receiving the same thereby wasting soap and creating a mess on the floor.

Another issue with previous dispensers is that they are generally manufactured for either private or public places, but not both. For example, if a dispenser is to be placed in a public location (i.e. road side washroom) it would be preferred that the dispenser be locked to prevent tampering, but allow for a technician, with the appropriate key to unlock the dispenser to refill the liquid product or maintain the dispenser. On the other hand, if a dispenser is to be placed in a private location (i.e. small business restroom or home) it would be preferred that anyone, such as employees, homeowners, or the cleaning crew, have free access to the contents within the dispenser to replace or maintain the same as needed. Accordingly, should a facility incorporate public and private areas, or a retailer sell to both businesses and private users, it would need to provide two separate dispensers.

As such, there is a desire for a dispenser configured to optimally supply liquid to a hand in a reliable, predictable and ergonomically convenient manner, and that is further configured to be selectively locked for placement in a public and/or a private location.

SUMMARY OF THE INVENTION

Accordingly, the present invention is intended to address and obviate problems and shortcomings and otherwise improve previous liquid product dispensers.

To achieve the foregoing and other objects and in accordance with the exemplary embodiments of the present invention a refillable product dispenser comprises a housing including a frame and a front cover having open and closed positions relative to the frame, a receptacle associated with the housing and a reversible pushbutton configured to be at least partially received by the receptacle in one of alternative unlocked and locked orientations.

To still further achieve the foregoing and other objects of the present invention, a product dispenser comprises a housing including a frame and a front cover having open and closed positions relative to the frame, a receptacle associated with the housing and a removable pushbutton configured to be removably and at least partially received by the receptacle in one of alternative unlocked and locked positions.

To yet further achieve the foregoing and other objects in accordance with other exemplary embodiments of the present invention, a dispensing system comprises a container configured to hold liquid product to be dispensed and a spout assembly associated with the container. The spout assembly may comprise a dispensing spout disposed at a delivery angle and a nozzle associated with the dispensing spout, with the nozzle disposed at a dispensing angle relative to the delivery angle. The dispensing system further comprises a dispensing lever configured to activate the spout of the spout assembly when force is applied to the lever.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
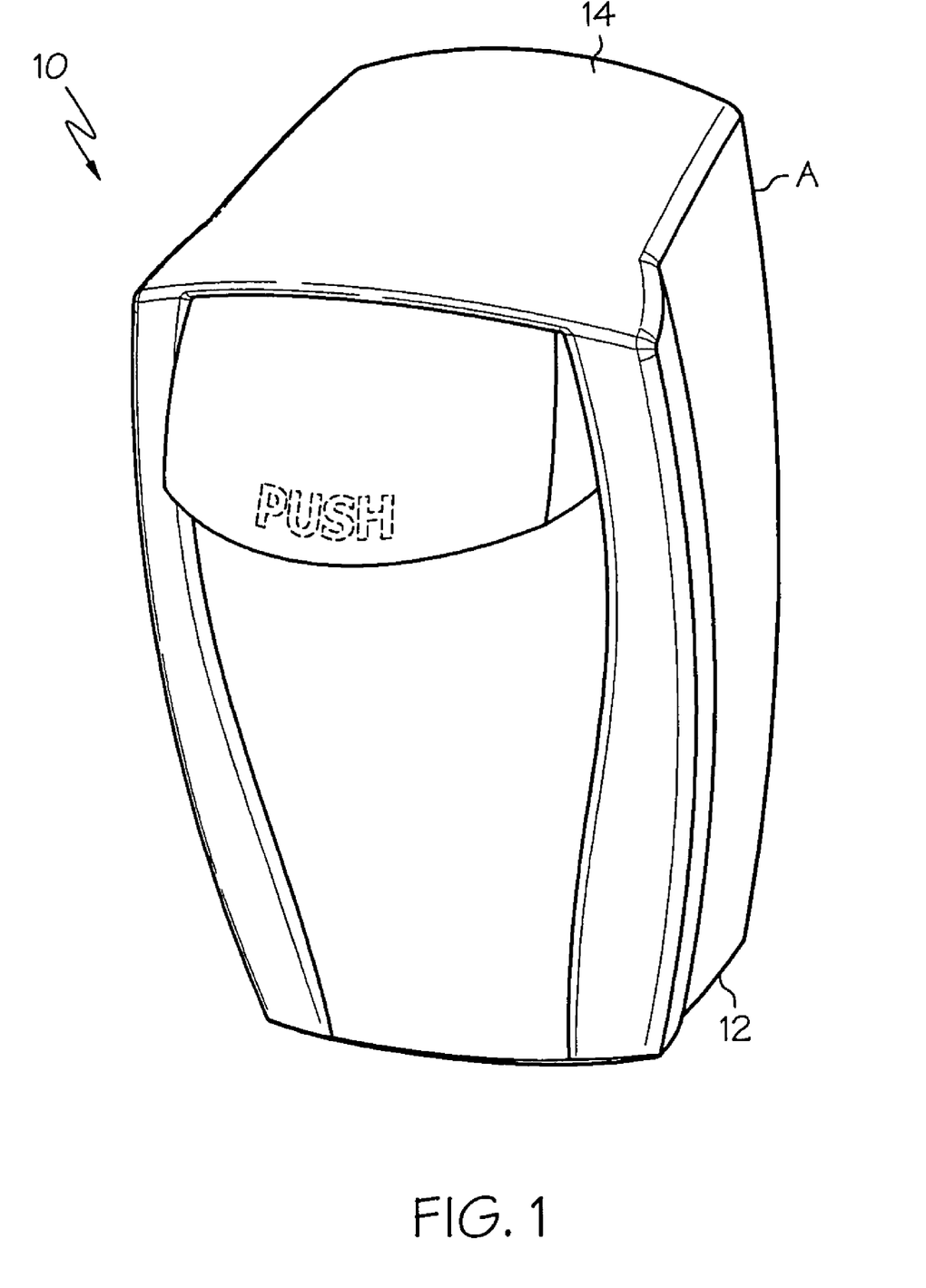
FIG. 1 is a front, top perspective view of an exemplary product dispenser in accordance with one embodiment of the present invention.

Referring to the drawing figures in detail, wherein like numerals indicate the same elements throughout the drawing figures, FIGS. 1-9 illustrate details of a product dispenser 10 in accordance with exemplary embodiments of the present invention. As illustrated in FIG. 1, the product dispenser 10 comprises a frame 12 and a front cover 14. As discussed later herein, front cover 14 may also be configured to comprise or carry a dispensing lever (e.g. 120 in FIG. 9) for selective dispensing liquid contents stored in a container within dispenser housing 11. FIG. 1 illustrates front cover 14 in a closed position, whereas in FIG. 2, front cover 14 is illustrated in an open position. As, shown in this example, cover 14, may be hingedly or otherwise removably attached to the frame 12 (e.g. at 16a and 16b in FIG. 2) and locked thereto in several locations (e.g. locking members 36 in FIG. 2). The features of the front cover 14 and its points of locking with the frame 12 are not critical, and it should be understood that front cover 14 may be provided in a number of different embodiments including one hingedly secured to the top of frame 12, to one side of frame 12 (e.g. reminiscent of a door), to the bottom of the frame, slidably secured relative to frame 12, or in other arrangements as might be desirable and determined by those skilled in the art.

Figure 2:
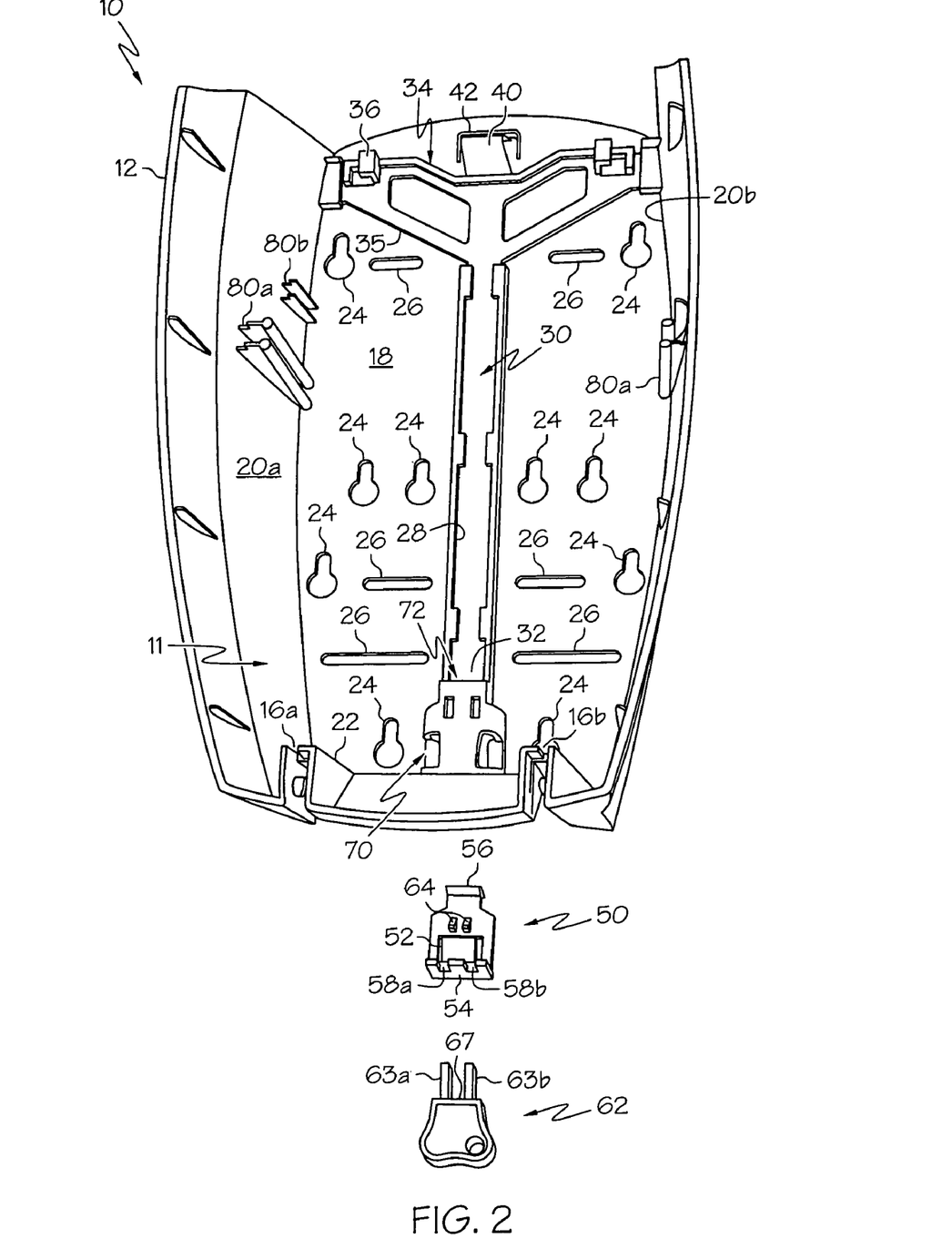
FIG. 2 is a front perspective view of an exemplary product dispenser in accordance with the present invention with the front cover shown in an open position.

As illustrated in FIG. 2, frame 12 may comprise a number of components configured to provide for selective locking of a front cover 14 thereto, and for mounting dispenser to any of a variety of facility walls or hanging surfaces. For example, frame 12 may comprise generally a rear wall 18, two side walls 20a and 20b and a bottom wall 22. These walls, along with the front cover 14 form the dispenser housing 11 and define an enclosure for holding a container of liquid product to be disposed. As discussed later herein, a container may comprise a rigid, semi rigid and/or flexible package configured to be secured within housing 11 such as by, for example, securing a mounting flange of a dispensing system to mounting grooves 80a and 80b located in side walls 20a and 20b of frame 12, as illustrated in this example.

Rear wall 18 of frame 12 may be configured to be secured to a vertical mounting surface such as a wall, cabinet or fixture, for example, by inserting a fastener through hanging apertures 24 and securing the fastener including the dispenser 10 to the mounting surface. In another embodiment, housing frame 12 and front cover 14 may be configured so that dispenser 10 may be secured to a horizontal surface (i.e. to the bottom side of a countertop). Alternatively, dispenser 10 may be secured to a mounting surface with hanging apertures 24 and/or hanging openings 26 such as though a snap and lock arrangement or other conventional fastening arrangement fastening. Similar to the front cover 14 and its points of locking with the frame 12, any of a number of methods and/or arrangements may provided to secure the dispenser to a surface.

As illustrated in FIG. 2, rear wall 18 of this example is also shown as comprising longitudinal channel 28 configured to at least partially receive and guide a release activator 30. Release activator 30 may comprise first and second ends 32 and 34, and in this example is configured to release the front cover 14 at one or more latch points upon upward movement. More particularly, first end 32 of release activator 30 may comprise an ledge 33 (best seen in FIG. 4) configured to selectively interact with a pushbutton 50 (discussed further below) such that upward movement of pushbutton 50 causes release activator 30 to similarly move upward. As illustrated in FIG. 2, second end 34 of release activator 30 may comprise a yoke member 35 including two latching members 36 on its outermost ends configured to engage latching nubs 38 on opposite upper ends of front cover 14 (best seen in FIG. 9). Accordingly, when release activator 30 is moved upward, yoke 35 similarly moves upward so that latching members 36 disengage latching nubs 38 and front cover 14 may be hingedly opened or pulled downwardly to expose the interior housing 11 of dispenser 10. Once upward force is released (e.g. the pushing force on pushbutton 50 is released), activator bias 40 located on second end 34 of release activator 30 may decompress against bias stop 42 to return release activator 30 downward to its normally locked position. Accordingly, in this embodiment, the front cover 14 may be released and locked through associated movement of the release activator 30 via pushbutton 50.

It should be understood that release activator 30 of the present invention may comprise a number of embodiments configured to unlatch or unlock the front cover so as to provide access to the interior of dispenser for maintaining the dispenser or replacing/refilling a liquid contents container. More particularly, any arrangement configured to lock and release the front cover 14 at one or more locking points could equally be substituted, including, but not limited to various conventional latch mechanisms or arrangements.

Accordingly, one feature of the present invention is a configuration that provides for selective locking of the front cover 14 to the frame 12, or more particularly, as shown in this exemplary embodiment, selective movement of the release activator 30 so as to control movement of the front cover 14 between open and closed positions. Referring to FIGS. 2-7, this feature may be accomplished by providing an externally accessed pushbutton 50 which is configured to be at least partially received by a receptacle 70, such as might be formed along the back wall 18 of frame 12 in the example. While pushbutton 50 is illustrated as being received by a receptacle within frame 12, it will be understood that receptacle 70 may be similarly be associated with front cover 14 or anywhere with respect to housing 11. In the illustrated example, pushbutton 50 may be relatively freely moved upwardly within receptacle 70 in its unlocked orientation to engage release activator 30 thereby releasing several locking points (as discussed above) between the frame 12 and its cover 14 for access to the interior of the dispenser 10. Such unlocked orientation would be utilized when the dispenser will be used in a facility where user access to the interior of the housing can be unrestricted (e.g. private or professional facility use).

Figure 3A:
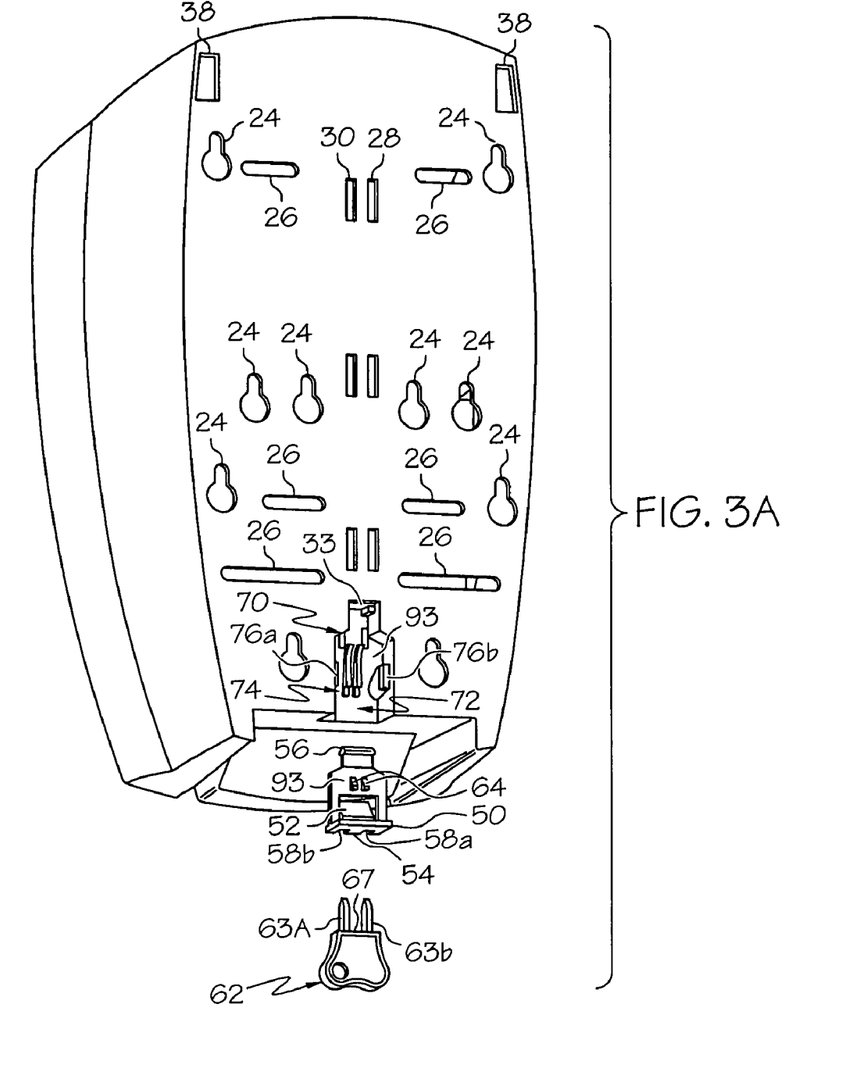
FIG. 3A is a rear perspective view of the exemplary product dispenser of FIG. 2.
Figure 4:
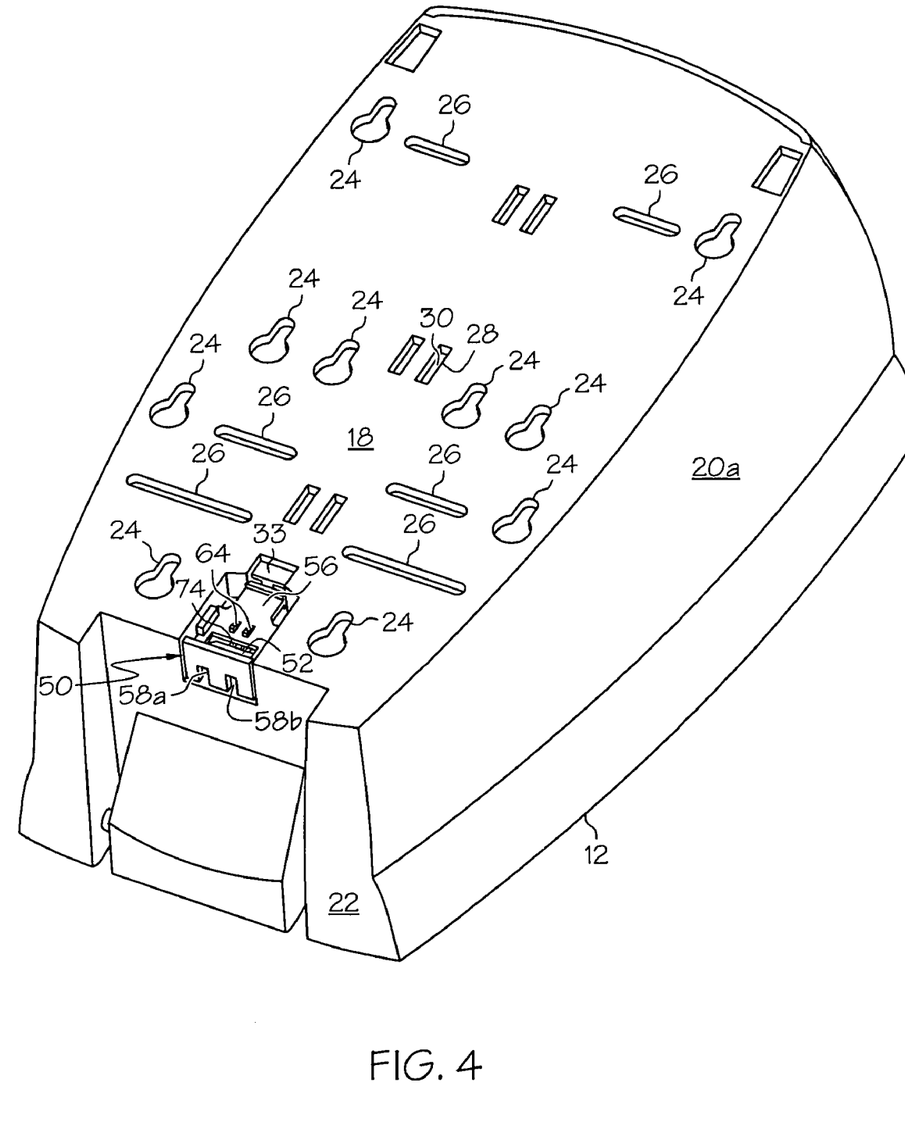
FIG. 4 is a rear view of an exemplary product dispenser in accordance with the present invention showing an example where the pushbutton is in a locked orientation.

As will be understood, however, if the pushbutton 50 cannot be moved within the receptacle (e.g. in its locked orientation), the cover 14 cannot be opened, and access cannot be gained. Referring to FIGS. 2-4, an exemplary pushbutton 50 and receptacle 70 are illustrated. Because FIG. 2 illustrates a front view of rear wall 18 and pushbutton 50 and FIG. 3 illustrates a rear view of rear wall 18 and pushbutton 50, portions of both sides of pushbutton 50 may be viewed for understanding how this particular example works. As will be discussed, pushbutton 50 as illustrated in FIGS. 2-4 may be received by receptacle 70 of frame 12 in one of two predetermined orientation—i.e. "locked" or unlocked" orientation.

Figure 3B:
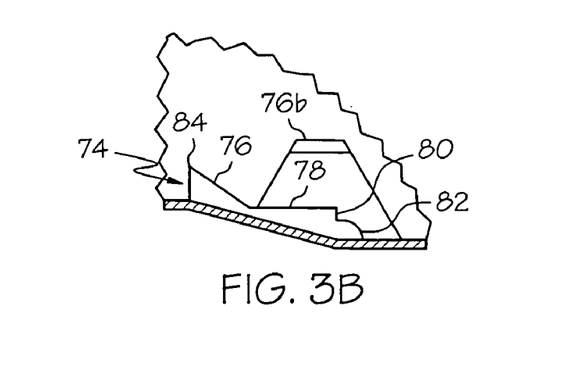
FIG. 3B is a side view of an exemplary lockout rib of FIG. 3A in accordance with the present invention.
Figure 5:
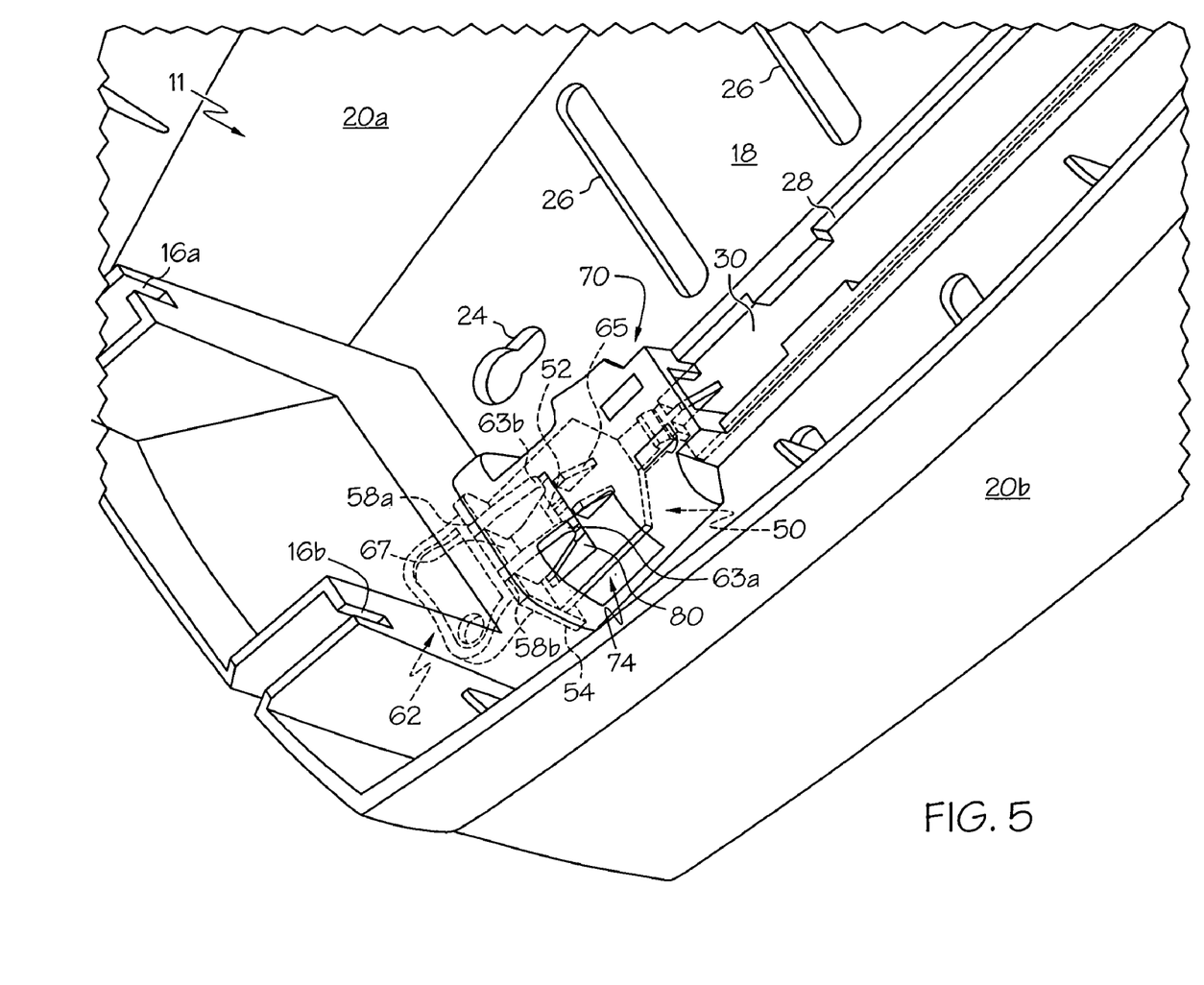
FIG. 5 is an enlarged and partially broken out broken out front perspective view of the exemplary pushbutton and key configuration of FIGS. 3 and 4.

As seen best in FIG. 2, pushbutton 50 may comprise a lockout member or tab 52 oriented upwardly and outwardly just above the push surface 54 and below an upper head portion 56. The push surface 54 of the pushbutton 50 also may include two spaced openings 58a and 58b sized and spaced to receive spaced prongs 63a and 63b of a special release key 62 (described further below) for selectively permitting authorized unlocking of the front cover 14. The head portion 56 of the pushbutton is designed to interact with the release activator 30, such as by interfacing with a ledge 33 formed in the first end 32 of the release activator 30 (best seen in FIGS. 3-4). Pushbutton 50 may also include one or more fingers 64 located on both sides of pushbutton 50 for guiding and maintaining the pushbutton 50 within the receptacle 70. As illustrated in FIG. 2 and discussed above, receptacle 70 extends into the interior of housing 11 and is configured to at least partially receive and selectively secure a pushbutton 50 therein. In addition, as best seen in FIGS. 3-5 receptacle 70 includes a detent arrangement 72 located on receptacle floor 92 comprising lockout ribs 74. As best shown in FIG. 3B, which illustrates a side view of an exemplary lockout rib 74, each lockout rib 74 may comprise a ramp member 76, a guide member 78, a step member 80 and a stop member 82.

Referring to FIGS. 3-4, pushbutton 50 may be positioned with receptacle 30 in a locked orientation, where access to the interior of the dispenser is to be restricted. More particularly, pushbutton 50 may slide under receptacle arms 76a and 76b, and pushbutton head 56 may contact ramp member 76. Additional force may be applied to pushbutton 50 until head 56 slides over apex 84 of ramp member 76. Pushbutton 50 is thereby captively retained and prevented from unauthorized removal from the receptacle 70 as a result of the engagement between the head 56 of pushbutton 50 and the apex 84 of lockout rib 74. Also, pushbutton 50 is further retained as pushbutton fingers 64 associate with the guide members 78 of lockout rib 74 to effectively lift the pushbutton 50 and bring it into closer association with receptacle arms 76a and 76b.

Figure 6:
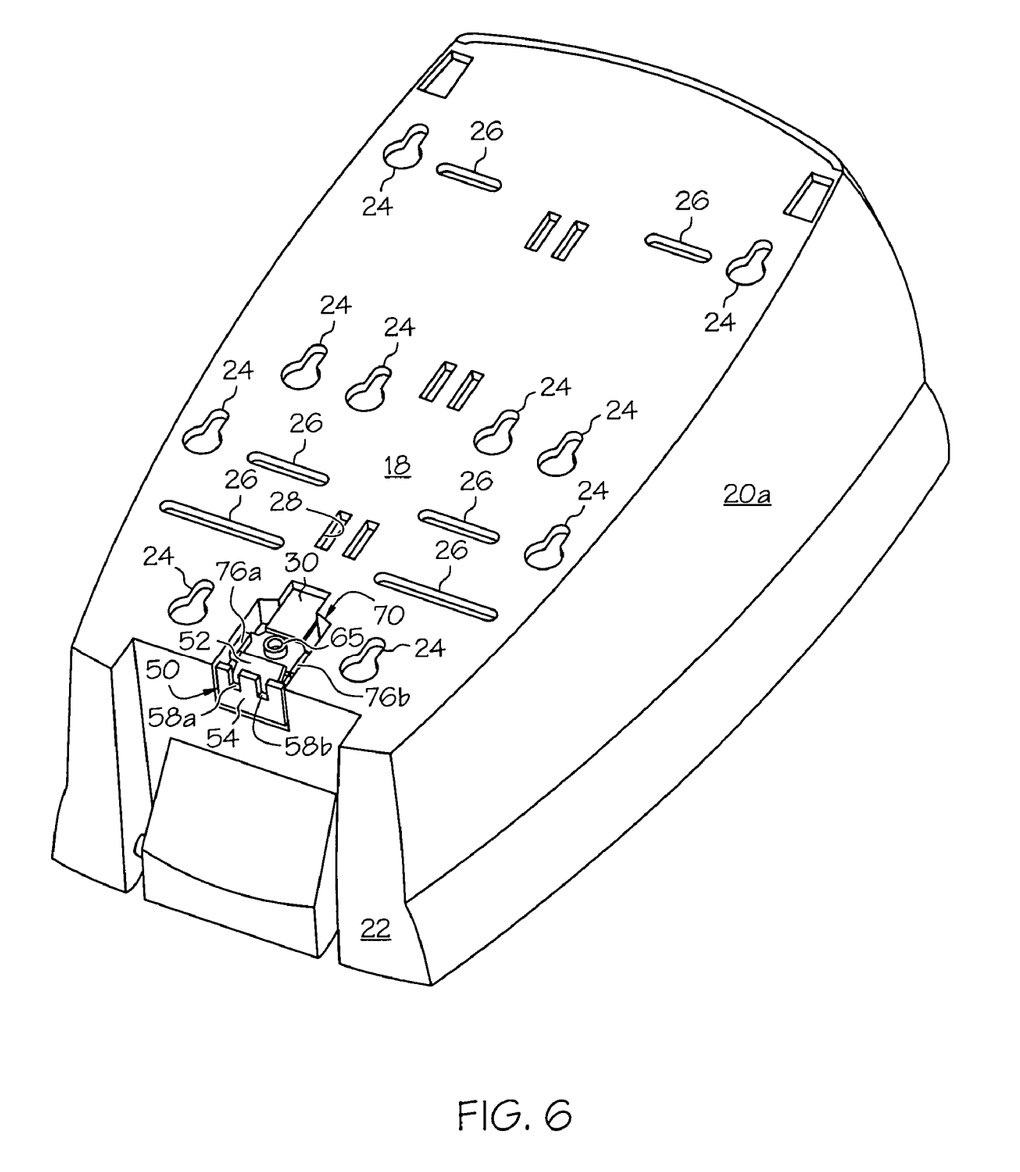
FIG. 6 is another rear view of the product dispenser of FIGS. 2 and 4, showing the pushbutton in an unlocked orientation.

In another embodiment, such as that shown in FIGS. 5-6, certain functions of the fingers 64 and head 56 of pushbutton 50 illustrated in FIGS. 2-4 can be alternatively provided by ring 65. As illustrated, ring 65 may be used to engage release activator 30 (rather than head 56) when pushbutton 50 is in an unlocked orientation. Likewise ring 65 helps bring the pushbutton 50 into closer association with receptacle arms 76a and 76b. It will be appreciated that other arrangements may accomplish the same function within the scope of the invention and that the exemplary embodiments are intended only as illustrative examples of the invention.

Referring again to FIGS. 3-4, pushbutton 50 is prevented from activating the release activator 30 as a result of the engagement between the pushbutton tab 52 and the step member 80 of the lockout rib 74. Once the pushbutton 50 is snapped into position within the receptacle 70, it will be appreciated that the tab 52 is oriented inwardly, and that pushing upwardly of the pushbutton 50 will cause interference of this tab 52 with the lockout ribs 74. Accordingly, the configuration shown in the exemplary embodiment of FIGS. 2-4 prevents the pushbutton 50 from being moved within the receptacle 70 and ultimately prevents movement of release activator 30 to so that front cover 14 cannot be moved to an open position.

It is contemplated that pushbutton 50 may be positioned within the receptacle 70 in its locked orientation (e.g., FIGS. 2-4) when the dispenser is located in a public place (e.g., public washroom) and the owner of the dispenser seeks to prevent access to and/or tampering with the dispenser contents. However, from time to time, it is necessary for authorized personnel to have access to the interior of the dispenser such as when liquid contents container needs to be refilled or when other cleaning or maintenance may be desired. One feature of the present invention, is a dispenser that can be selectively locked so that the same dispenser can be purchased for use in pubic or private location. When access to the dispenser is desired, authorized personnel may use the release key 62 to engage pushbutton 50 so that front cover 14 can be opened without changing the orientation of the pushbutton.

More particularly, as illustrated in FIGS. 2, 3 and 5, key 62 may comprise special design corresponding with the pushbutton and dispenser structures to limit authorized access. In the examples shown, a pair of outwardly extending prongs 63a and 63b including angled camming surfaces 63 are provided. As best seen in FIG. 5, the tab 52 of pushbutton 50 can be manipulated over step member 80 of lockout rib 74 by inserting the prongs 63a and 63b of the key upwardly into the openings 58a and 58b of the pushbutton 50. In this way, camming surfaces of prongs 63a and 63b are pushed through the openings 58a and 58b of the pushbutton 50 so that they contact the tab 52 of the pushbutton 50 and deflect tab 52 inwardly, thereby allowing the tab 52 to move past the lockout ribs 74 without interference. As the key is further inserted, key surface 67 comes in contact with push surface 54 of pushbutton 50 so that key 62 and pushbutton 50 can be pushed upwardly together thereby moving the release activator 30 upwardly to release the latching members 36 and move the front cover 14 into an open position. Without the special key however, the pushbutton cannot be appreciably moved within the receptacle. Consequently, by orienting the pushbutton in its locked orientation, the dispenser can be provided with a locking system.

As mentioned, there may be times however, that the owner of the dispenser of the present invention may want to provide the dispenser in a "free access" condition, such as when the dispenser is located in a small business or professional atmosphere where threats of tampering are not of concern. Accordingly, another feature of the present invention is that the dispenser can be provided in such a free access condition, whereby pushbutton 50 is in an unlocked orientation and can relatively freely move within receptacle 70 to open front cover 14 and allow access without the use of a key 62. This unlocked orientation is illustrated in FIG. 6 wherein the tab 52 is oriented outwardly and away from the lockout ribs 74 shown in FIGS. 2-4. In other words, the tab 52 of the pushbutton 50 would be directed oppositely or otherwise away from potentially interfering structures (e.g. stop member 80 of lockout ribs 74). As can be appreciated, pushing inwardly on the pushbutton 50 then correspondingly forces the release activator 30 upwardly, thereby releasing latching members 36 or the like which hold the cover 14 in locked or closed position relative to the frame. Because many installations of liquid dispensers do not need the locking feature in this unlocked orientation, the pushbutton 50 would allow for access to the interior of the dispenser at any time by pushing upwardly on the pushbutton 50 and the release activator 30 to allow opening of the front cover 14.

Accordingly, the pushbutton 50, and ultimately the dispenser, of the present invention may be provided in a locked or unlocked orientation or condition. Moreover, authorized users can choose the condition desired by simply reversing the orientation of the pushbutton 50 by using the special key. If the user wanted to effectively change the accessibility condition of the dispenser (e.g. between locked and unlocked conditions), the user could accomplish the same according to one embodiment of the present invention by simply reversing the orientation of the pushbutton 50.

Figure 7:
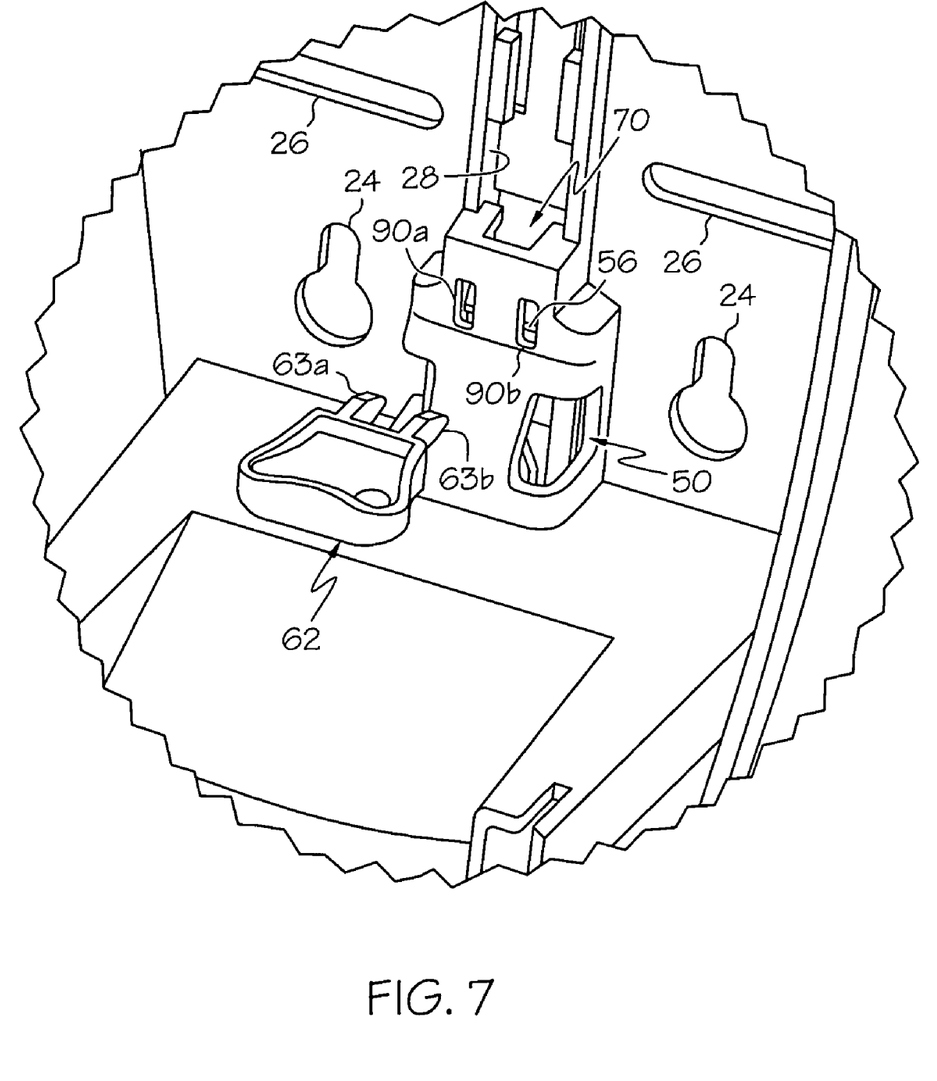
FIG. 7 is an enlarged front perspective view of a portion of the interior of exemplary product dispenser illustrating an exemplary method using a key to facilitate selective removal of the pushbutton from the receptacle.

More particularly, referring to FIG. 7 the release key 62 (or a different special key, if desired) could be inserted into the discharge slots 90a and 90b on the underside of receptacle floor 92. The camming surfaces of prongs 63a and 63b would thereby interact with the head 56 of the pushbutton 50 to effectively force the head 56 over apex 84 of ramp member 76 of lockout rib 74 to free the pushbutton from the receptacle 70 and the dispenser 10. As such, it will be appreciated that if a user seeks to change the dispenser from a locked to an unlocked condition, the user could first insert key 62 into 58a and 58b pushbutton 50 to allow movement of the "locked" pushbutton and release activator. This, in turn, allows the user to open the front cover 14. The user may then use key 62 again, inserting the same into discharge slots 90a and 90b, thereby allowing removal of the pushbutton from receptacle 70. Then the user would reverse the pushbutton 50 and position it into its unlocked orientation and snap the pushbutton back into receptacle 70.

As used herein, the terms "reverse" or "reversible" can mean that the pushbutton has two or more predetermined orientations, wherein the front face of the pushbutton is structurally and operably oriented at a different direction (e.g. 30°, 45°, 90°, 180° or some other angle) than other operable faces. For example, as described in the exemplary embodiment in FIG. 2, the front face of pushbutton is that which engages step of lockout ribs so as to prevent opening of the front cover (e.g. locked orientation). The locked front face is oriented 180° from unlocked front face (e.g. that which does not engage step lockout ribs so as to allow opening of the front cover). In another embodiment, pushbutton may, for example, have three operable faces oriented 45° from one another, wherein each face is operable to provide a certain characteristic (e.g. unlocked, locked, semi-locked condition). Accordingly, it will be understood that pushbutton of the present invention may have two or more operable faces that when, in different orientation, are active to provide a characteristic of the dispenser.

In addition, while the pushbutton has thus far been described as a removable article that is pushed to engage a release activator, such limitations are neither intended nor required to practice the present invention. Moreover, while receptacle has been described as including a detent mechanism, receptacle may include any arrangement configured to at least partially receive and retain a pushbutton. For example, in another embodiment, pushbutton may comprise a cylinder with an inner gear shaped arrangement at least partially received by a receptacle and located at any position about the frame or front cover (e.g. housing) and configured to receive a fitted key. The cylinder may be moved (through sliding or rotation) between locked and unlocked orientations with a fitted key, and accordingly, the dispenser can be changed between locked and unlocked conditions. In another embodiment, for example, cylinder may be pushed and rotated to change the dispenser between locked and unlocked conditions. In an unlocked orientation, release activator may be free to move to release latching members or other such locking arrangement. While it may be necessary to provide a separate arrangement to activate the release activator in such an embodiment, the present invention is still practiced by way of providing a configuration for selectively changing the locking condition of the dispenser. Accordingly, it is contemplated that any configuration comprising a pushbutton configured to be at least partially received by a receptacle in one of alternative unlocked and locked orientations is within the claims and scope of the present invention.

Figure 8:
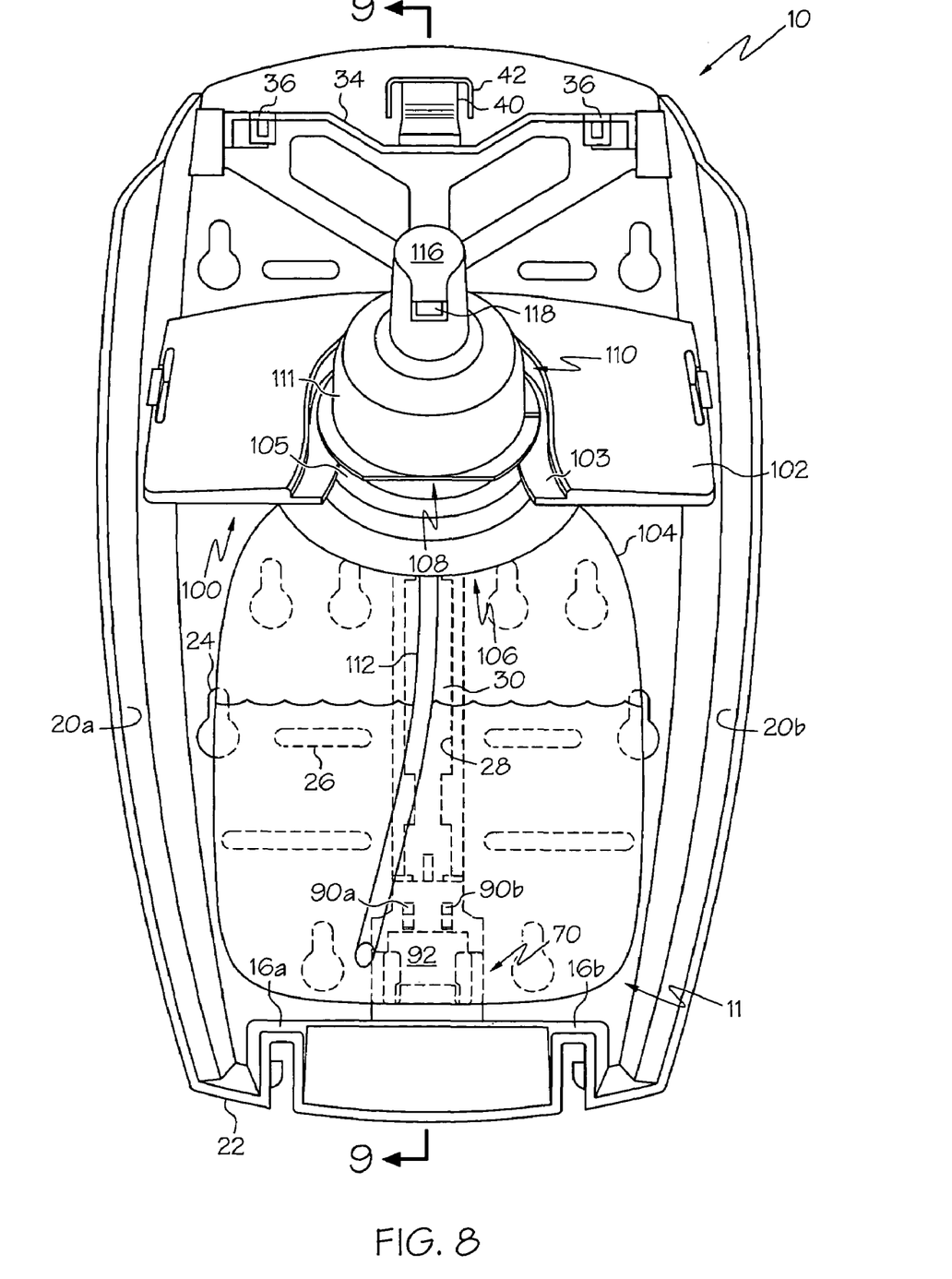
FIG. 8 is a front view of an exemplary product dispenser including an exemplary dispensing system in accordance with one embodiment of the present invention.
Figure 9:
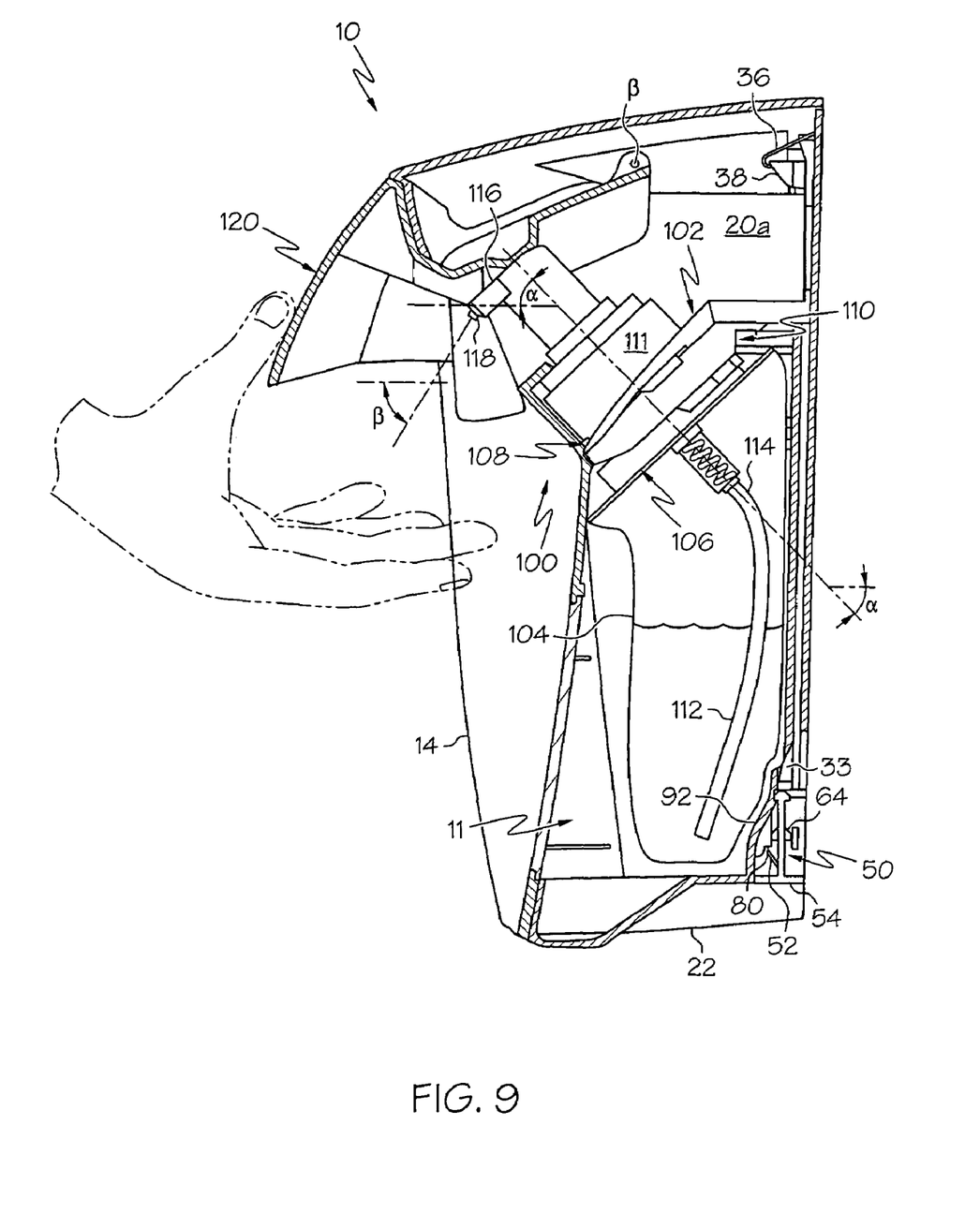
FIG. 9 is a partial cross-section of the product dispenser of FIG. 8 taken along line 9-9 thereof and showing the unsectioned exemplary dispensing pump and other dispensing system parts.

Yet another aspect of the present invention is that the dispenser is configured to conveniently dispense a product to a user. Most dispenser systems are provided in a vertically upright or upside down configuration, whereby a ball-type check valve in the product supply line can prevent any "suck back" into the pumping system which would compromise the ability of the pump to provide a full "stroke" of full "dose" each time. The full stroke ensures a uniform and predetermined amount of product being dispensed each time the pump is activated. For example, for a hand soap application, each full stroke might deliver a predetermined, uniform "dose" of approximately 0.75 ml, as determined by the pump chamber sizing and dispensing characteristics. As seen in FIG. 9, for example, the dispensing system can be angled at a predetermined angle of approximately 60 degrees from vertical, while still retaining standard ball check valve operation and proper function of the pump. Referring to FIGS. 8-9 the dispenser housing 11 is illustrated as including a dispensing system 100. Dispensing system 100 can include a mounting flange 102 configured to situate the spout assembly 110 at approximately 45 degrees relative to horizontal in use. In one embodiment, mounting flange 102 may be secured to mounting grooves 80a and 80b (best shown in FIG. 2) located on side walls 20a and 20b of frame 12 through a snap—lock type of setup or other fastening arrangement. As seen best in FIG. 8, this arrangement might include a locking rim 103 on flange 102 which slidably receives a peripheral collar or groove 105 formed around at least a portion of the skirt 111 and neck portion 108 of the pump assembly 110. This arrangement might have a snap fit and/or use friction interference to removably hold the pump assembly in operable dispensing position.

Dispensing system 100 may further include a container 104 configured to hold a volume of liquid. As mentioned, container 104 might comprise a flexible bag or reservoir, a rigid bottle, a semi-rigid structure, or a combination. It is contemplated that the dispenser can dispense foam soap, however, it should be understood that dispensing system of the present invention may dispense any type of liquid, including, but not limited to liquid soap. Accordingly, liquid, as used herein, can comprise liquid soap, foam soap, hand cream, lotion, shampoo and other such materials. Dispensing system 100 may also comprise a spout assembly 106 associated with the container 104. In one embodiment, spout assembly 106 may comprise a neck 108 configured to snap into mounting flange 102, as described above. In another embodiment, spout assembly 106 and mounting flange 102 may be a single piece configured to be removably secured with the housing 11 of dispenser 10.

Spout assembly 106 may also comprise a conventional pump assembly 110, suction line 112 and ball-type check valve assembly 114 configured to draw liquid from the container 104. As illustrated, spout assembly 106 may further include a dispensing spout 116 disposed at a delivery angle $\alpha$. The delivery angle $\alpha$ is the result of placement of the mounting flange so as to orient a dispensing outlet at a desired angle, such as at approximately 45 degrees relative to horizontal, in use. Of course, it will be understood that the delivery angle may vary relative to the dispensing angle (discussed later herein) to achieve an overall supply angle (that angle which liquid is effectively provided relative to a user's hand) of approximately 60 degrees.

Dispensing spout 116 is of course configured to deliver liquid to nozzle 118. As illustrated, nozzle 118 may be associated with dispensing spout 116 and disposed at a second dispensing angle $\beta$ relative to said delivery angle $\alpha$. In one embodiment, dispensing angle may be approximately 15 degrees. Accordingly, dispensing angle $\beta$ may provide an effective supply angle (that angle at which the liquid is actually dispensed out of dispenser) greater than 45 degrees (e.g., approximately 60 degrees). Similar to delivery angle, however, it will be understood that the dispensing angle may vary relative to the delivery angle to achieve the desired supply angle. This nozzle may also be configured to "foam" the liquid product as it is dispensed or otherwise affect the spray pattern or dispensing characteristics as desired. Because check valve type liquid pumping systems, however, can generally not be oriented at a severe angle much beyond 45 degrees without suffering performance problems due to effects of gravity on the ball check valve, the addition of a nozzle at a delivery angle can help to provide a supply angle which exceeds normal angling limitations of pump dispensers. Nozzle 118 could be formed with dispensing spout 116, added to the spout after manufacture, or provided as an independent piece attached thereto.

The supply angle provided by the nozzle 118 with the angled spout assembly 110 mount provides an advantageous supply angle for the liquid product or foam into the hands of a user. As illustrated, a dispensing lever 120 can be associated with the dispenser, such as by rotatable mounting to the front cover 14 at hinge point B and associated with spout assembly 110 so that, upon depressing the dispensing lever 120, the spout assembly will be activated and liquid will be dispensed from the dispenser at a desired location and at the supply angle, namely directly into the palm of a user's hand 130 (such as shown in phantom in FIG. 9). Moreover, because the lever 120 is located toward the upper end of the dispenser, a user can simply depress the lever with the palm of one hand 130 and receive dispensed liquid in the cupped fingers of the same hand. As such, the need to use two hands to dispense liquid (e.g. one hand to pump, the other to receive) is eliminated. Accordingly the dispensing angle combined with the delivery angle yields a supply angle that facilitates dispensing of liquid in a convenient and optional manner to a user while also preventing excess spillage of the liquid. In the case of a foam product for example, this setup allows delivery of a "pillow" of foam into the user's hand more efficiently and with more convenient placement. Again, the specific characteristics of the product delivery can be adjusted as desired (e.g. spray, jetspray, foam) by choice of the nozzle characteristics.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the locking feature of the refillable product dispenser wherein the pushbutton may be received by a receptacle in one of alternative locked and unlocked orientations may comprise a variety of different arrangements. Accordingly, while some of the alternative embodiments of the refillable product dispenser have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

We claim:

1. A refillable product dispenser comprising:
   (a) a housing including a frame and a front cover having open and closed positions relative to said frame;
   (b) a receptacle associated with said housing; and
   (c) a pushbutton selectively reversible between operable faces and configured to be at least partially received by said receptacle in one of alternative unlocked and locked orientations said pushbutton having an opening for receiving a key to facilitate movement of said pushbutton within said receptacle when said pushbutton is in said locked orientation, wherein said pushbutton may not be moved within said receptacle when said pushbutton is in said locked orientation, without use of the key.

2. The dispenser of claim 1, wherein said pushbutton is removably received by said receptacle.

3. The dispenser of claim 1, further comprising a detent arrangement configured to prevent movement of said pushbutton within said receptacle when said pushbutton is in said locked orientation when the key is not inserted into the opening.

4. The dispenser of claim 3, wherein said detent arrangement comprises a stop member and a lockout member each being associated with one or the other of said housing receptacle and said pushbutton, respectively.

5. The dispenser of claim 1, further comprising a release activator associated with said pushbutton and said front cover.

6. The dispenser of claim 5, wherein said release activator is configured to release said front cover upon upward movement of said pushbutton within said receptacle.

7. The dispenser of claim 1, further comprising a dispensing system including:
   (a) a product container configured to be removably associated with said housing and to hold product to be dispensed;
   (b) a spout assembly associated with said container, said spout assembly comprising a dispensing spout disposed at a delivery angle;
   (c) a nozzle associated with said dispensing spout, said nozzle disposed at a dispensing angle relative to said delivery angle; and
   (d) a dispensing lever configured to activate said spout assembly when force is applied to said lever.

8. A refillable product dispenser comprising:
   (a) a housing including a frame and a front cover having open and closed positions relative to said frame;
   (b) a receptacle associated with said housing, said receptacle having a discharge slot;
   (c) a pushbutton selectively reversible between operable faces and configured to be at least partially received by said receptacle in one of alternative unlocked and locked orientations; and
   (d) a key configured to be received by said discharge slot to facilitate selective movement of said pushbutton between said operable faces of said pushbutton, said operable faces corresponding to said locked and unlocked orientations.

9. A refillable product dispenser comprising:
   (a) a housing including a frame, a front cover having open and closed positions relative to said frame, and a dispensing lever configured to dispense said refillable product;
   (b) a receptacle associated with said housing;
   (c) a removable pushbutton configured to be at least partially received by said receptacle in one of alternative unlocked and locked orientations, wherein when said front cover is in said closed position and said pushbutton is in said locked orientation, said pushbutton can not be moved within said receptacle without a key, and wherein said pushbutton is in said unlocked orientation, said pushbutton may be moved within said receptacle to facilitate opening of said front cover.

10. The dispenser of claim 9, wherein said pushbutton is selectively reversible between operable faces.

11. The dispenser of claim 9, further comprising a detent arrangement configured to prevent movement of said pushbutton within said receptacle when said push button is in said locked orientation.

12. The dispenser of claim 11, wherein said detent arrangement comprises a stop member and a lockout member each being associated with one or the other of said housing receptacle and said pushbutton, respectively.

13. The dispenser housing of claim 9, wherein said key is configured to facilitate selective movement of said pushbutton within said receptacle when said pushbutton is in said locked orientation.

14. The dispenser housing of claim 9, wherein said key is configured to facilitate alternation of said pushbutton between said unlocked and locked orientations.

15. The dispenser housing of claim 9, further comprising a release activator associated with said pushbutton and said front cover.

16. The dispenser housing of claim 15, wherein said release activator is configured to release said front cover upon upward movement of said pushbutton when in an unlocked position.

17. The dispenser housing of claim 9, further comprising a dispensing system including:
   (a) a product container configured to be removably associated with said housing and to hold said refillable product;
   (b) a spout assembly associated with said container, said spout assembly comprising a dispensing spout disposed at a delivery angle;
   (c) a nozzle associated with said dispensing spout, said nozzle disposed at a dispensing angle relative to said delivery angle; and
   (d) said dispensing lever configured to activate said spout assembly when force is applied to said dispensing lever.

18. A refillable product dispenser comprising:
   (a) a housing including a frame and a front cover having open and closed positions relative to said frame;
   (b) a receptacle associated with said housing; and
   (c) a pushbutton selectively reversible between operable faces and configured to be at least partially received by said receptacle in one of alternative unlocked and locked orientations,
   (d) wherein said unlocked orientation allows the pushbutton to be moved in said receptacle without a key so that said front cover can be moved from said closed position to said open position, and said locked orientation prevents the pushbutton from being moved in said receptacle without the use of said key.

19. The dispenser of claim 18, wherein said key is configured to facilitate selective movement of said pushbutton within said receptacle when said pushbutton is in said locked orientation.

20. The dispenser of claim 18, wherein said pushbutton is removably received by said receptacle.

21. The dispenser of claim 18, wherein said key is configured to facilitate alternation of said pushbutton between said unlocked and locked orientations.

22. A refillable product dispenser comprising:
   (a) a housing including a frame and a front cover having open and closed positions relative to said frame;
   (b) a dispensing lever associated with said housing and a spout, said dispensing lever configured to dispense said refillable product;
   (c) a receptacle associated with said housing;
   (d) a release activator associated with said front cover; and
   (e) a pushbutton associated with said release activator, said pushbutton configured to be at least partially received by said receptacle in one of alternative unlocked and locked orientations, said dispenser comprising a detent arrangement having a stop member and a lockout member each being associated with one or the other of said housing receptacle and said pushbutton, respectively, configured to prevent engagement of said pushbutton with said release activator when said pushbutton is in said locked orientation.

* * * * *